United States Patent
Shiell et al.

[11] Patent Number: 5,961,632
[45] Date of Patent: Oct. 5, 1999

[54] MICROPROCESSOR WITH CIRCUITS, SYSTEMS, AND METHODS FOR SELECTING ALTERNATIVE PIPELINE INSTRUCTION PATHS BASED ON INSTRUCTION LEADING CODES

[75] Inventors: Jonathan H. Shiell, Plano; Donald E. Steiss, Richardson, both of Tex.

[73] Assignee: Texas Instruments Incorporated, Dallas, Tex.

[21] Appl. No.: 08/897,998

[22] Filed: Jul. 25, 1997

[51] Int. Cl.[6] .................................................. G06F 9/00
[52] U.S. Cl. ........................ 712/212; 712/11; 712/200; 712/203; 712/206; 712/208; 712/209; 712/210; 712/213; 712/215; 712/235
[58] Field of Search ..................... 395/800.09, 800.42, 395/800.43, 376, 388, 393, 800.25, 800.26; 712/1, 9, 200, 203, 206, 208, 212, 213, 235, 10, 11, 209, 16, 215

[56] References Cited

U.S. PATENT DOCUMENTS

| | | | |
|---|---|---|---|
| 4,322,795 | 3/1982 | Lange et al. | 711/136 |
| 4,750,112 | 6/1988 | Jones et al. | 395/393 |
| 5,233,696 | 8/1993 | Suzuki | 395/380 |
| 5,301,285 | 4/1994 | Hanawa et al. | 395/388 |
| 5,625,834 | 4/1997 | Nishikawa | 395/800.09 |
| 5,673,407 | 9/1997 | Poland et al. | 395/563 |
| 5,692,167 | 11/1997 | Grochowski et al. | 395/576 |

*Primary Examiner*—Meng-Ai T. An
*Assistant Examiner*—Dzung C Nguyen
*Attorney, Agent, or Firm*—Robert D. Marshall, Jr.; Gerald E. Laws; Richard L. Donaldson

[57] ABSTRACT

A processor processes a plurality of instructions according to a disclosed method. First, the method receives (32) an instruction from the plurality of instructions. Second, the method determines (34) whether the received instruction is preceded by an instruction path leading code. Third, the method passes (36 or 38) the received instruction along at least one instruction path in a plurality of instruction paths. Fourth, in response to determining that the received instruction is preceded by an instruction path leading code, the method executes a machine word corresponding to the received instruction and selected from one of the plurality of instruction paths. Specifically, the selected instruction path is selected in response to the instruction path leading code.

25 Claims, 5 Drawing Sheets

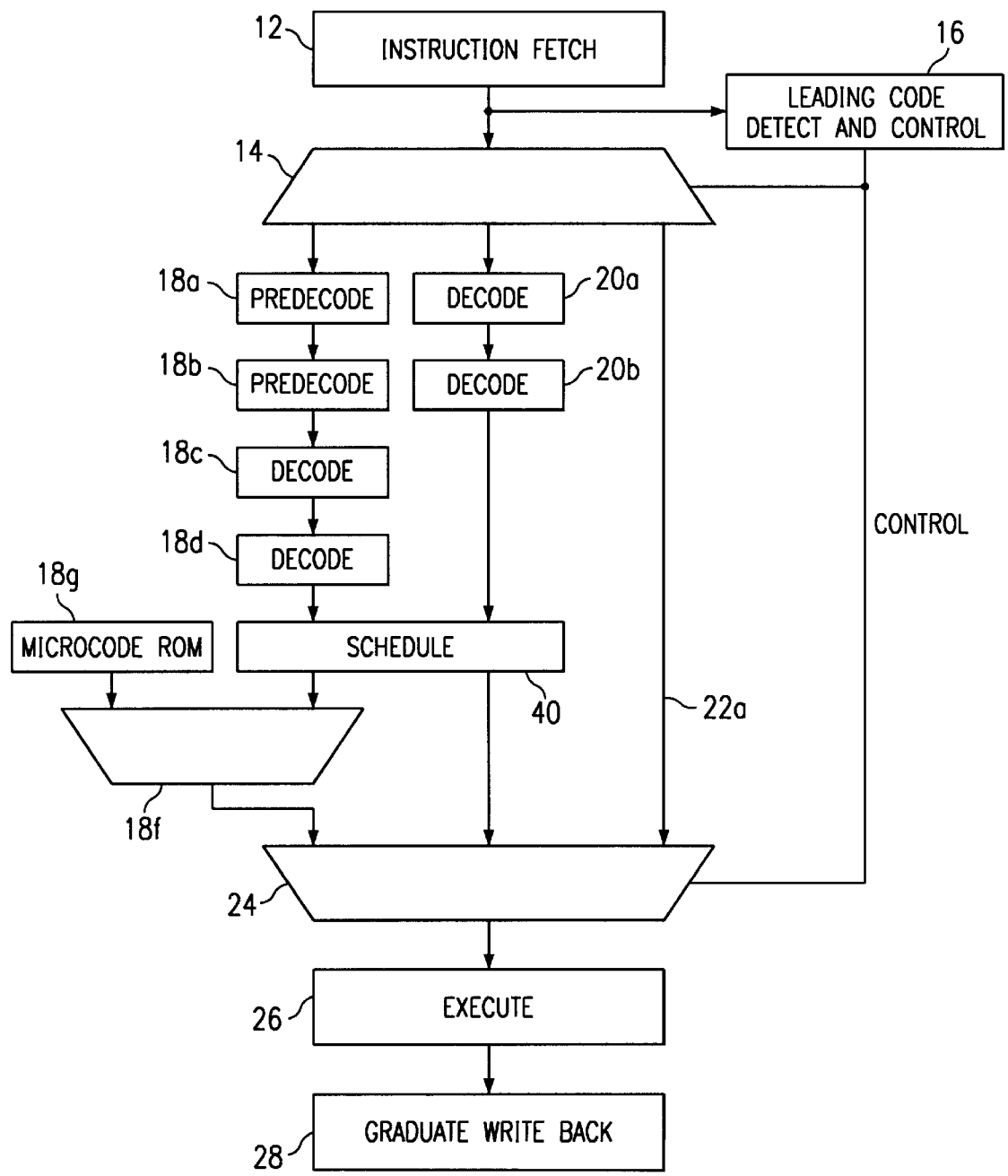

MICROPROCESSOR WITH CIRCUITS, SYSTEMS, AND METHODS FOR SELECTING ALTERNATIVE PIPELINE INSTRUCTION PATHS BASED ON INSTRUCTION LEADING CODES

TECHNICAL FIELD OF THE INVENTION

The present embodiments relate to microprocessors, and are more particularly directed to a microprocessor with circuits, systems, and methods for selecting alternative pipeline instruction paths based on instruction leading codes.

BACKGROUND OF THE INVENTION

The embodiments described below involve the developing and ever-expanding field of computer systems and microprocessors. Modern microprocessors often now include a pipeline with numerous stages so that different instructions may be at different stages at the same time of operation. Moreover, some microprocessors include more than one pipeline in this manner and, therefore, can perform more than one instruction execution at a time. Naturally, the ability to execute more than one instruction at a time provides vast increases in processor speed and, therefore, is highly desirable.

The stages of a microprocessor pipeline provides different functions on an instruction as it passes through each pipeline stage. Typically, a pipeline commences with an instruction fetch stage, which retrieves one or more instructions which are encoded according to a single required format according to the instruction set architecture ("ISA") of the given microprocessor. After the fetch stage, a pipeline often includes various decode stages which receive a fetched instruction and convert it, which is sometimes referred to as decompressing it, to a form which can be executed. This executable form may then pass through one or more stages, such as a scheduling stage, and then is connected to an execution stage for execution. After execution, the pipeline graduates the instruction. In addition, the result of the instruction, if any, may be written to some store such as a register file. This last operation is commonly referred to as write back.

While the above approach provides beneficial in many respects, the present inventors have discovered various of its limitations. For example, the decode stages of the pipeline are typically limited to a single ISA. Thus, those decode stages and the microprocessor using them are necessarily limited to programs written for that ISA, and entire programs or program threads written for a different ISA will not properly function on this limited-scope microprocessor.

In view of the above as well as other considerations, there arises a need to address the drawbacks of the prior art and to provide a microprocessor with circuits, systems, and methods which allow proper operation in instances such as using instructions from more than one ISA, or where it is desirable for different instructions to pass through different pipeline stages.

SUMMARY OF THE INVENTION

In a preferred method embodiment, a processor processes a plurality of instructions. First, the method receives an instruction from the plurality of instructions. Second, the method determines whether the received instruction is preceded by an instruction path leading code. Third, the method passes the received instruction along at least one instruction path in a plurality of instruction paths. Fourth, in response to determining that the received instruction is preceded by an instruction path leading code, the method executes a machine word corresponding to the received instruction and selected from only one of the plurality of instruction paths. Particularly, the selected instruction path is selected in response to the instruction path leading code. Other circuits, systems, and methods are also disclosed and claimed.

BRIEF DESCRIPTION OF THE DRAWINGS

FIG. 3b illustrates the embodiment of FIG. 3a where a common schedule circuit is shared by separate instruction paths;

DETAILED DESCRIPTION OF THE PREFERRED EMBODIMENTS

Figure 1:
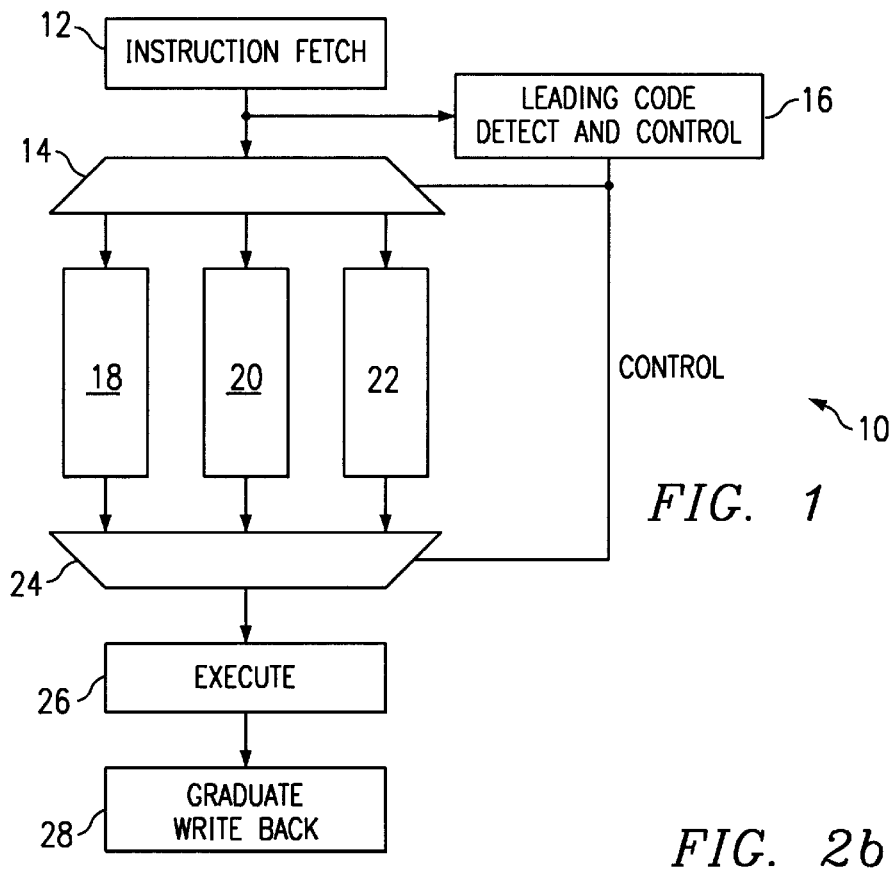
FIG. 1 illustrates a schematic and block diagram of a pipeline instruction path selection system.

FIG. 1 illustrates an alternative instruction path selection system in accordance with the present embodiments and designated generally at 10. System 10 may be included in various types of microprocessor structures, and an example of one such structure is detailed below in connection with FIG. 5. At this point, however, various details related to such a microprocessor are not discussed in order to simplify the present discussion. Turning then to system 10, note generally that it depicts from top to bottom various successive stages through which one or more instructions may pass. Often in the art a group of such successive stages is referred to as an instruction pipeline. As demonstrated below, a pipeline in accordance with the present embodiments may follow along different instruction paths, that is, some of the stages in one path differ from some of the stages in an alternative path. Each of these stages is discussed below.

System 10 begins with an instruction fetch stage 12. Instruction fetching by stage 12 may occur from various resources such as instruction caches and various levels of memory. Moreover, stage 12 may fetch more than one instruction at a time. To simplify the following discussion, however, a single instruction is discussed at a time as it follows from stage 12 to subsequent stages.

The output from instruction fetch stage 12 is connected to the input of a demultiplexer 14 and also to the input of a leading code detect and control circuit 16. Demultiplexer 14 operates as known in the art, that is, to route the information received at its input to one of a given number of outputs in response to a control signal. Indeed, circuit 16 detects certain codes as detailed below, and in response controls this routing operation of demultiplexer 14. Specifically, demultiplexer 14 includes three outputs, and the control signal (illustrated as "CONTROL" on FIG. 1) connected to demultiplexer 14 causes the instruction received at the input of demultiplexer 14 to be routed to one of these three outputs.

Each of the three outputs of demultiplexer 14 is connected to a respective instruction path. Specifically, system 10 includes three instruction paths 18, 20, and 22 connected to corresponding outputs of demultiplexer 14. Instruction paths 18, 20, and 22 are shown simply as blocks in FIG. 1, while the details included within those blocks are not set forth at this point to simplify the current discussion. A more detailed illustration of an example of paths 18, 20, and 22 is deferred until FIG. 3a, below. At this point, note only that each of paths 18, 20, and 22 represents a path through which a fetched instruction may pass. As detailed later, however, each instruction path may include a direct bus connection, or may include various stages to further respond to an instruction, such as predecode, decode, issuing or scheduling, and others either known or ascertainable by a person skilled in the art.

Regardless of the particular stages (if any) in each of paths 18, 20, and 22, each of those stages ends by connecting to a respective input of a multiplexer 24. Multiplexer 24 is also controlled by the CONTROL signal output by leading code detect and control circuit 16. Multiplexer 24 operates as known in the art, that is, to select the information received at one of its inputs and to connect the selected information to its output in response to a control signal. Thus, as detailed below, multiplexer 24 connects an instruction from either path 18, 20, or 22 to its output in response to the CONTROL signal from circuit 16.

The output of multiplexer 24 is connected to an additional instruction stage, which in the preferred embodiment is an execute stage 26. Execute stage 26 receives a group of bits in a format referred to in this document as a "machine word". The machine word includes one or more groups of bits corresponding to at least one instruction and which are in a format which will properly execute given the architecture of the microprocessor. For example, for certain instruction set architectures ("ISAs") such as complex instruction set computers, and for certain manufacturers, it is known that bits must be decoded (and possibly scheduled) for proper execution. As another example, for other ISAs such as those using very long instruction word ("VLIW"), the bits in the VLIW instruction are already in a format which may be executed without further decoding. These as well as other examples ascertainable by a person skilled in the art are intended to fall within the scope of a machine word as that term is used in this document. In any event, therefore, the format presented to execute stage 26, regardless of the instruction path the instruction takes, is in this proper machine word format and ready for execution as of the time it reaches execute stage 26. Further, the machine word typically may be executed in a single execution clock. Note also that a given machine word actually may cross instruction boundaries, that is, it may include bits corresponding to more than one instruction. Still further, note that machine words, or portions of such words, have different names depending on the architecture and/or manufacturer. For example, in the Texas Instruments' standard, the codes making up the machine word are referred to as atomic operations ("AOps"). These AOps, if completed in their entirety, represent completion and graduation of the instruction set instruction, including its opcode and operands if applicable. AOps are comparable to what is referred to in other architectures as ROps, or μOps. Moreover, note further that execute stage 26 preferably represents the existence of multiple execution units, such as multiple load/store units, multiple arithmetic logic units, and a floating point unit. Thus, during operation, the entirety (or a subset) of these units receive portions of the machine word and perform their corresponding execution function.

Lastly, the output of execute stage 26 is connected to a graduate/write back stage 28. Stage 28 graduates the instruction, meaning it is allowed to complete and take its effect, if any, on the architected state of the microprocessor. In addition, the result of the instruction, if any, may be written to some store such as a register file. This last operation is commonly referred to as write back, and sometimes is considered a function which is not part of the final pipeline stage, but which occurs at the same time the instruction is graduated.

Figure 2A:
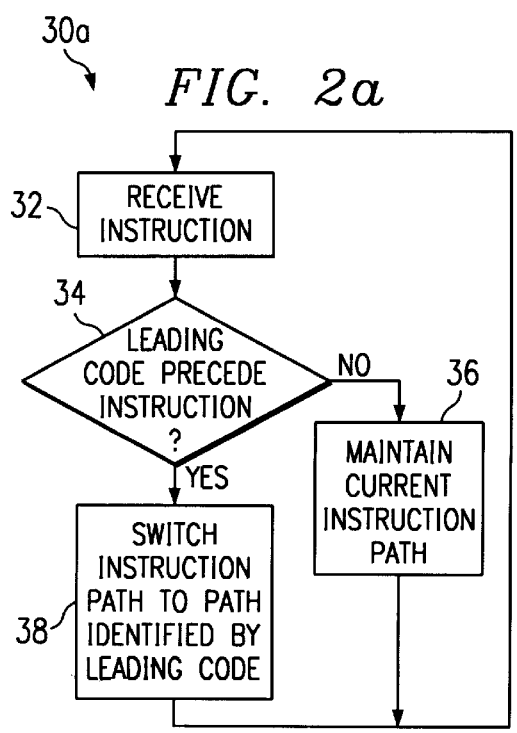
FIG. 2a illustrates a flowchart of a method embodiment of operation of the system shown in FIG. 1.

Having demonstrated the various components, connections, and certain operations of system 10, FIG. 2a illustrates a flow chart of a method embodiment 30a for operation of system 10 with greater emphasis on the effects of circuit 16 as well as the use of the multiple instruction paths 18, 20, and 22. To simplify the following explanation, it is helpful first to establish an instruction convention as well as an introductory assumption. Regarding the instruction convention, let us abbreviate each instruction with a capital "I" followed by a number, so that instructions sequentially following a first instruction may be represented with increasing numbers. For example, assume a first instruction is I1, followed sequentially by I2, and so forth. Additionally, assume method 30a occurs at some time after one or more instructions already have passed through system 10. For example, assume a given instruction is I100, with instructions I1 through I99 already having passed through system 10.

Turning to method 30a of FIG. 2a, in step 32 instruction fetch stage 12 receives instruction I100 from an instruction sequence arranged in a typical sequential fashion. I100 may be retrieved individually, or as part of a group of instructions. In any event, system 10 then evaluates I100 as follows. Circuit 16 performs step 34 and determines whether I100 is immediately preceded by what is referred to in this document as an instruction path leading code for reasons more evident below. The instruction path leading code may be in different formats, but in any event is preferably set forth in the instruction stream so as to distinguish one or more instructions following the instruction path leading code and to accomplish the functionality set forth below. For example, the instruction path leading code may take the form of an instruction prefix where it is included within the boundary of the defined instruction, but actually precedes those instruction bits which actually cause the specific operations which define the instruction. Note in this example it is still preferable that the leading code precede the actual operation-causing bits of the instruction and, therefore, it is intended to include this type of alternative when defining the instruction path leading code. As another example, the instruction path leading code may be comparable to an escape code which precedes an instruction. In any event, the leading code is established so that it may be detected in sufficient time to then affect any instruction to be controlled by the leading code. Therefore, since instructions are sequential in nature, it is preferred that the leading code be in some format which precedes any instruction to be affected by the leading code. Consequently, still other examples will be ascertainable as skilled in the art, where each such code may be detected in order to take the responses as demonstrated in the remainder of this document. Moreover, note that circuit 16 may be constructed according to various known principles once the preferred format is chosen for the instruction path leading code. For example, if an instruction prefix is used to indicate an instruction path leading code, then as a fetched instruction is output from stage 12, it includes the instruction path leading code prefix which, recall, is connected to the input of circuit 16. Consequently, circuit 16 may include proper prefix decoding or detecting circuitry which recognizes the instruction path leading code prefix in order to begin the responsive actions described below.

Continuing with method 30, the determination by step 34 transfers operational control to either step 36 or step 38. Specifically, if the current instruction (e.g., I100) is not preceded by an instruction path leading code, the flow continues to step 36. Conversely, if the current instruction is preceded by an instruction path leading code, the flow continues to step 38. As demonstrated below, steps 36 and 38 select or maintain a path along any of paths 18, 20, and 22, using the control by circuit 16 as well as the routing and selection by demultiplexer 14 and multiplexer 24, respectively.

For a currently received instruction which is not preceded by an instruction path leading code, step 36 maintains the current instruction path so that the currently received instruction continues along the same instruction path as the immediately preceding instruction. For example, assume that system 10 passes instruction I99 along path 18. More specifically, to accomplish that assumption, note that the CONTROL signal from circuit 16 causes demultiplexer 14 to route I99 to path 18, and further causes multiplexer 24 to select I99 after it completes path 18 and pass it to execute stage 26. Next, therefore, in step 36 and with respect to I100 (i.e., the instruction following I99), step 36 maintains the current path so that I100 also is routed along path 18 and to execute stage 26. Stated in terms of the overall circuit, therefore, step 36 maintains the CONTROL signal at the same state so that an instruction is passed, using demultiplexer 14 and multiplexer 24, along the same path as the immediately preceding instruction. After step 36, method 30a returns to step 32 to proceed with the next received instruction.

In contrast to the above, for a currently received instruction which is preceded by an instruction path leading code, step 38 switches the instruction path to the path identified by the leading code. For example, if the leading code identifies a path other than the path from the immediately preceding instruction, then step 38 switches the instruction path so that the currently received instruction continues along a different path than that followed by the immediately preceding instruction. For example, assume again that system 10 passed I99 along path 18 using the CONTROL signal to control demultiplexer multiplexer 24. Next, however, and with respect to I100, assume I100 is preceded by a leading code which identifies a path other than path 18. In this event, step 38 switches the current instruction path so that I100 is routed along an instruction path differing from the instruction path of the preceding instruction. Thus, in the example of FIG. 1, the differing path is either path 20 or path 22. More specifically, an identifier of the desired different path is preferably encoded in the leading code (according to whatever preferred technique), and step 38 in response causes the received instruction to pass along the identified instruction path. Stated in terms of the overall circuit, therefore, step 38 occurs by circuit 16 changing the CONTROL signal to a different state so that an instruction is passed, using demultiplexer 14 and multiplexer 24, along a different path than the immediately preceding instruction.

In addition to the above, note also that a leading code may precede an instruction, but may identify the same instruction path taken by the immediately preceding code. Returning to the above example of I99 and I100, therefore, I100 may be preceded by a leading code which identifies path 18 as the path to which to switch, even though I99 also passed along path 18. In this event, the leading code is still detected in step 34 and in step 38 demultiplexer 14 and multiplexer 24 are controlled in response to the leading code preceding I100 to ensure that I100 follows path 18.

After step 38, the flow returns to step 32 where the next instruction is received and processed in the same manner as described above. Note, therefore, that if the next instruction is not preceded by a leading code, then it will follow along the same path as the instruction preceding it. For example, if I101 is received, and if it is not preceded by a leading code, and if I100 passed along path 20, then I101 passes along path 20 as well. Indeed, given the embodiment of FIG. 2a, all instructions following I100 will continue along the same path as I100 until another leading code is encountered.

Figure 2B:
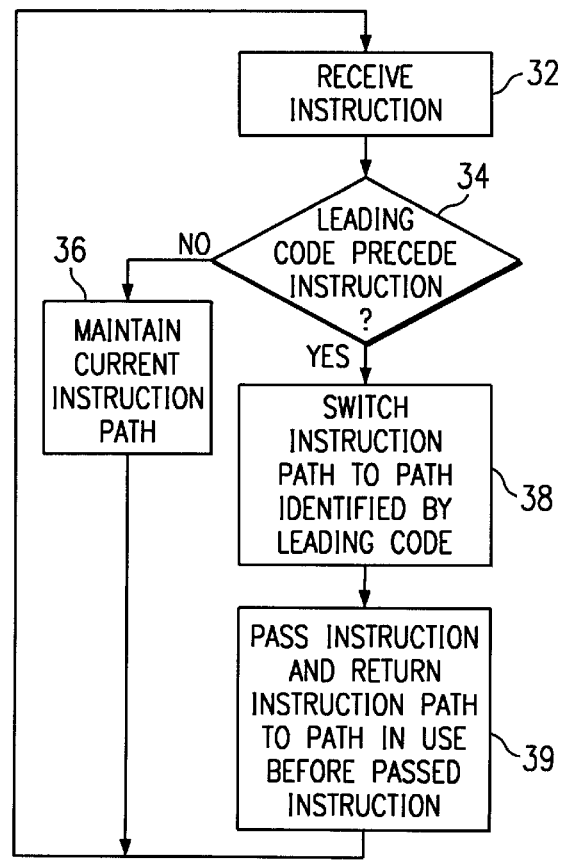
FIG. 2b illustrates a flowchart of an alternative method embodiment of operation of the system shown in FIG. 1.

FIG. 2b illustrates a method embodiment as an alternative to method 30a of FIG. 2a, with the alternative method designated generally at 30b. Method 30b includes each of the steps of method 30a and, therefore, the reader is referred to the above discussion for the details of such steps. In addition to those steps, method 30b further includes a step 39 following step 38, and which is detailed below.

Recall from above that step 38 switches an instruction to a path in response to a path identifier in the leading code, and that from method 30b all subsequent instructions will follow that same path at least until another leading code is detected. In contrast, however, in step 39, and after the current instruction passes to the switched instruction path, circuit 16 returns the CONTROL signal to the state in which it was set prior to the most-recently passing instruction. Returning to the above example where I99 passed along path 18 and I100 is preceded by a leading code indicating a switch to a different path, then step 39 has the following effect. First, I100 passes to either path 20 or path 22. Second, step 39 returns the CONTROL signal so that the next instruction (i.e., I101) will, absent additional changes to the CONTROL signal, pass through instruction path 18. As a result, method 30b allows a path change for a single instruction as opposed to a group of instructions following a leading code.

Given the above operational description, one skilled in the art will appreciate various aspects of the present embodiments. The above demonstrates that the stages through which an instruction passes are selected, in part, in response to an instruction path leading code. Thus, the effective pipeline for one instruction (i.e., the specific hardware stages followed) may differ from the effective pipeline of another instruction. Note also that the above embodiment assumes that a given instruction is allowed to pass, by control of demultiplexer 14, to only one of the multiple instruction paths 18 through 22. In an alternative embodiment, however, demultiplexer 14 could be eliminated so that each instruction passes through all instruction paths. However, only the machine word received at the end of one of those paths would then be selected using multiplexer 24, with the remaining information from the other paths preferably being disregarded. In such an event, therefore, the instruction would pass along at least the desired instruction path (if not all the others), but only the machine word corresponding to the desired instruction path would continue to stage 26 for execution. In any event, either of these alternative embodiments provide various benefits which should be appreciated by a person skilled in the art. For example, while three instruction paths are shown by way of example in FIG. 2a, either a greater or lesser number of instruction paths could be included in other embodiments. As still another benefit, note that the varying instruction paths also permit simplification in certain instances of backward compatibility for a single ISA which is greatly expanded over time. For example, it is common in the microprocessor industry for a given ISA to expand over time to include a larger number of instructions over its predecessors. Typically, it is desirable that the newer microprocessors still properly operate using the older instructions for the given ISA. As a result, it is common for the microprocessor designer to continuously redesign the decode stage(s) of the microprocessor to ensure that both the older as well as the newer instructions may pass through the same single decode stage(s), but also to properly decode to ensure accurate subsequent execution. Using the present embodiments, however, it is possible to route certain instructions along one instruction path with other instructions passing along a different instruction path, so that an instruction path known to properly operate for older instructions need not be re-designed, but instead need only be included as an alternative instruction path to a newly-designed instruction path which accommodates only certain newer instructions. Still further advantages will be ascertainable by a person skilled in the art.

Figure 3A:
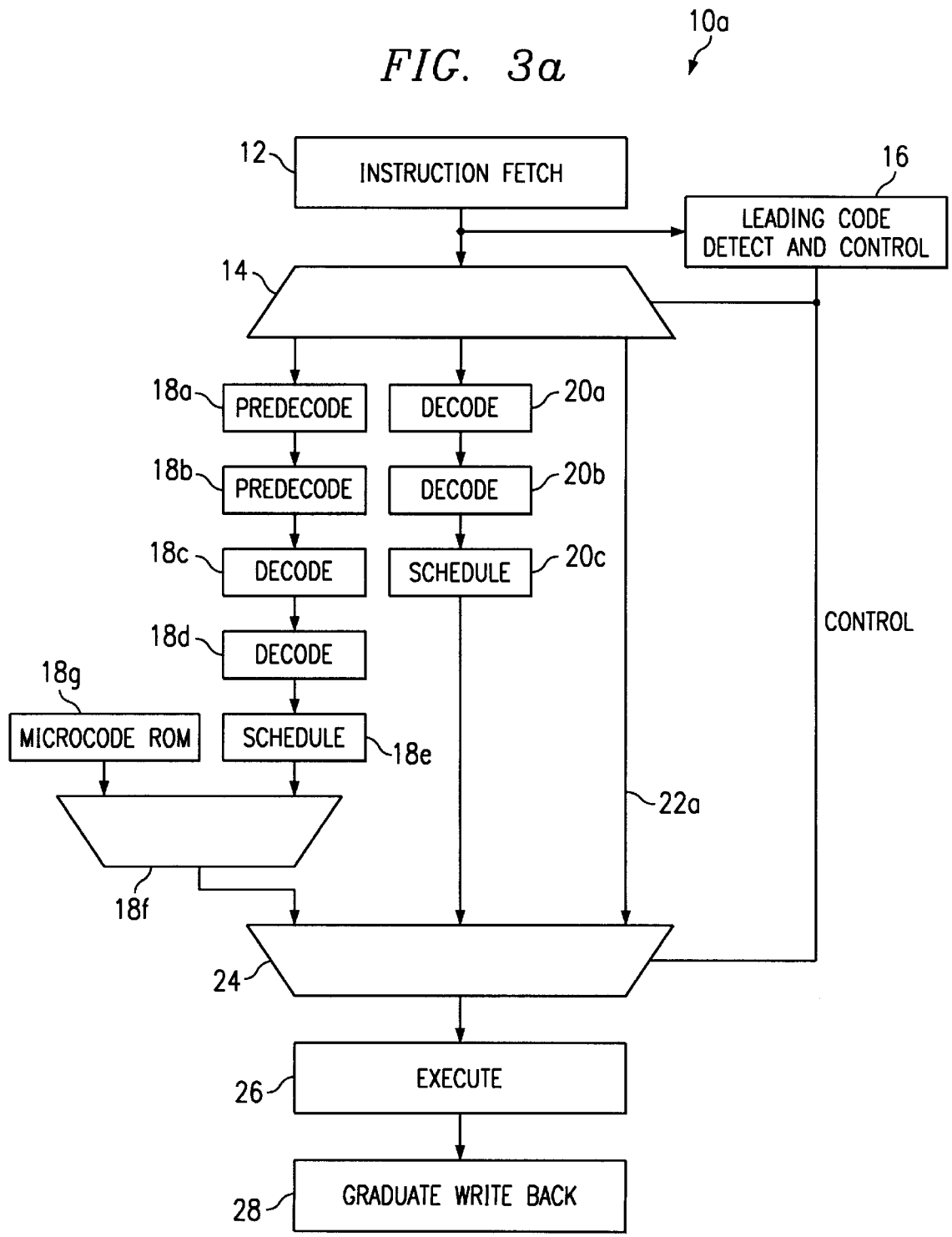
FIG. 3a illustrates an example of an embodiment using different instruction set architectures in the instruction paths shown in FIG. 1.

FIG. 3a illustrates a system 10a which is comparable to system 10 of FIG. 1, but further includes details relating to certain components of paths 18, 20, and 22. As an introductory matter, for purposes of FIG. 3a, each of paths 18, 20, and 22 represent known stages for differing ISAs. Specifically, path 18 represents common stages of a complex instruction set computer ("CISC") instruction path, path 20 represents common stages of a reduced instruction set computer ("RISC") instruction path, and path 22 represents a bus commonly used in a very long instruction word ("VLIW") instruction path. Each of these paths is discussed in greater detail below, with it known to a person skilled in the art how these as well as other ISAs use differing instruction processing stages, and with it recognizable as to how such ISAs may benefit from the present embodiments.

Instruction path 18 includes various stages of a CISC instruction path. Thus, instruction path 18 includes a decode unit which includes, in the current example embodiment, predecode stages 18a and 18b followed by decode stages 18c and 18d. As is known in the art, the number of decode and predecode stages may vary, and in some architectures all stages are referred to as decode stages. Following these stages, path 18 includes a schedule stage 18e, which in some architectures is referred to as an issue stage. Typically, such a stage assigns the decoded instruction to a corresponding execution unit. The decoded and scheduled instruction is connected to the input of a multiplexer 18f which also receives an input from a microprogram memory 18g which is often a read only memory referred to a microROM or microcode ROM. While not shown, multiplexer 18f receives control so that it may output either decoded and scheduled instructions or instructions from microprogram memory 18g. In either event, the output of multiplexer 18f thereby represents the end of path 18, with the output then connected to one input of multiplexer 24 to accomplish the operation described above in connection with FIG. 2a or FIG. 2b.

Instruction path 20 includes various stages of a RISC instruction path. As known in the art, RISC instructions require a lesser amount of decoding than CISC instructions and, therefore, path 20 includes a decode unit which includes, in the current example embodiment, only two decode stages 20a and 20b. Following these stages, path 20 includes a schedule stage 20c, which again is sometimes referred to as an issue stage and operates in the same manner as described above with respect to schedule stage 18e. The output from schedule stage 20c represents the end of path 20, with its output connected to another input of multiplexer 24 to accomplish the operation described above in connection with FIG. 2a or FIG. 2b.

Instruction path 22 is established to communicate a VLIW from instruction fetch stage 12 to execute stage 26. By definition, a VLIW exists in its original instruction form in the same format as may be executed by a given microprocessor. Therefore, path 22 includes only a bus 22a which may directly connect a VLIW, routed by demultiplexer 14 and multiplexer 24, to execute stage 26. Thus, one or more VLIW instructions may be retrieved from instruction fetch stage 12 and executed by stage 26 without incurring any decode or other intermediate stage(s).

Given FIG. 3a, it is evident that the state of the leading code can cause selection of a different ISA for certain processing steps of one or more instructions. As a result, there is the benefit that existing programs or program threads from different ISAs may be combined for use with system 10a without having to convert each of such programs to the same type of ISA code. In addition, note also that the same instructions passing through different instruction paths for different ISAs also can share certain stages without duplicating resources. For example, in FIG. 3a, a single instruction fetch stage may share a single instruction cache. As another example, the circuitry for execute stage 26 and graduate/write back stage 28 is also common as well. Still further, additional stages could be added or removed from those shown in FIG. 3a. Note further that such modifications could be made within an alternative instruction path between demultiplexer 14 and multiplexer 24, and also outside of the instruction paths, that is, either before demultiplexer 14 or after multiplexer 24.

FIG. 3b illustrates a system 10b which is comparable to system 10a of FIG. 3a, but which demonstrates an example as stated above where resources along two separate instruction paths may be shared, where those resources are between demultiplexer 14 and multiplexer 24. System 10b includes many of the components of system 10a of FIG. 3a and, therefore, like reference numerals are used in both Figures. System 10b, however, differs from system 10 given its circuitry included in paths 18 and 20 as directed to instruction scheduling. Specifically, note in FIG. 3b that decode stage 18d of path 18, and decode stage 20b of path 20, are both connected to a combined schedule circuit 40. In this embodiment, therefore, a decoded instruction may pass from either path 18 or 20 to schedule circuit 40, and schedule circuit 40 therefore outputs a machine word to multiplexer 24 which may then be executed by execute stage 26. Given the common schedule circuit 40, one skilled in the art will further appreciate that an instruction may be directed by demultiplexer 14 to either path 18 or 20 and the machine word for each of those paths is ultimately connected to a common schedule circuit 40.

Figure 4:
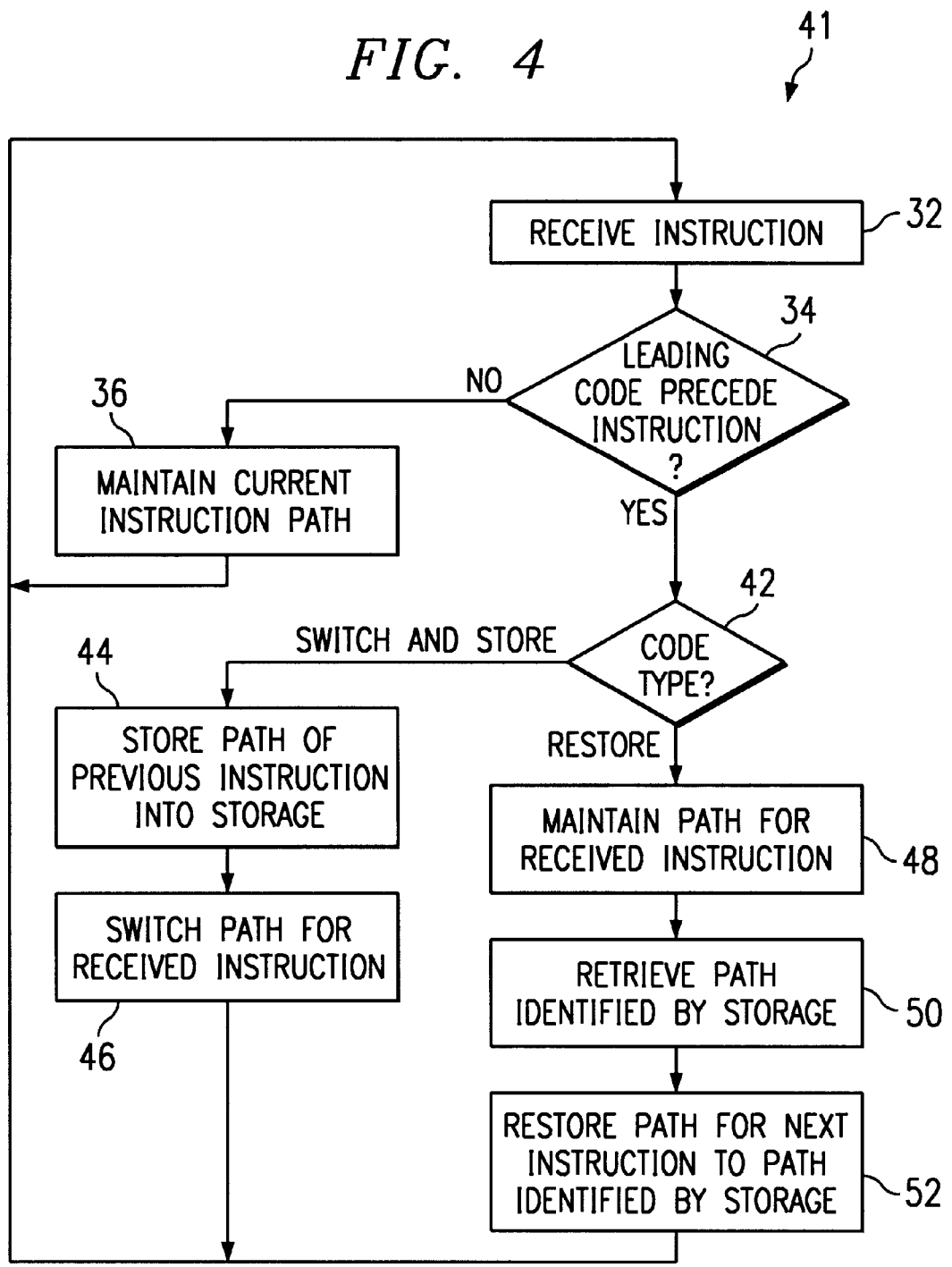
FIG. 4 illustrates a flowchart of an alternative method embodiment of operation of the system shown in FIG. 1.

FIG. 4 illustrates a flow chart of another method embodiment 41 for operation of system 10a and which again evaluates whether an instruction is preceded by a leading code; the FIG. 4 method, however, permits different actions for different types of leading codes. In method 41, steps 32, 34, and 36 are the same as those like-numbered steps in FIG. 2a and, therefore, the reader is generally referred to the above discussion for the details of those steps. Recall briefly that step 32 fetches an instruction followed by step 34 which determines whether the fetched instruction is immediately preceded by an instruction path leading code. Moreover, step 36 maintains the current path if the fetched instruction is not immediately preceded by an instruction path leading code. However, if the fetched instruction is immediately preceded by an instruction path leading code, the flow continues to step 42 and beyond as described below.

In the presently described embodiment, an instruction path leading code may be one of two types, referred to for reasons more clear below as either a switch and store code or a restore code. Given the two possibilities, step 42 determines which of the two types of leading codes has been incurred in step 34. If the instruction path leading code is a switch and store code, method 41 continues to steps 44 and 46. On the other hand, if the instruction path leading code is a restore code, method 41 continues to steps 48 through 52. Each of these separate sets of steps is addressed below.

The switch and store code causes the operation of steps 44 and 46 which as demonstrated below allow more than one instruction following the switch and store code to follow a given instruction path such as path 18, 20, or 22 shown in FIG. 1 (or FIG. 3*a*). Turning to these steps in particular, step 44 stores an identifier of the current instruction path, that is, the path followed by the most recently passed instruction. For example, returning briefly to FIG. 1, circuit 16 preferably includes some storage medium, or access to such a medium, for storing such an identifier. For example, circuit 16 may include a register, dedicated or otherwise, to store an identifier of the current instruction path. As an another example, the current instruction path could be placed on some type of memory stack. Still other examples will be ascertainable by a person skilled in the art. In any event, assume that I100 is received in step 32, that I100 is immediately preceded by a switch and store code, and that I99 passed through instruction path 18. In this case, step 44 stores an identifier of path 18. Next, step 46 switches the path for the currently received instruction (i.e., I100) to a different path which is identified by the switch and store code in the same, or a similar, manner as described above in connection with FIG. 2*a*. For example, assume the switch and store code indicates that I100 should pass through instruction path 20. As a result, step 46, using circuit 16, causes this switch so that I100 is routed through path 20 rather than path 18 which processed I99. After completing path 20, I100 continues to execute stage 26 and graduate/write back stage 28. Next, method 41 returns to step 32 which has the effects described below.

By the return of method 41 from step 46 to step 32, note now the operation if additional instructions are received after I100 and are not preceded by any type of leading code. In this event, the flow for each such instruction is through step 32, step 34, and step 36. As a result, since path 20 was selected for I100, then each instruction received after I100 also passes along path 20, through its stages, and then continues to execute stage 26 and graduate/write back stage 28. For example, assume that I101 through I105 are each received in successive occurrences of step 32, and each is not preceded by a leading code. As a result, each of I101 through I105 passes through path 20, and on to execute stage 26 and graduate/write back stage 28. One skilled in the art will therefore appreciate that the switch and store code preceding I100 also may select the instruction path for one or more instructions following I100. This also contrasts with method 30*a* of FIG. 2*a*, where in each instance that an instruction was to follow a desired path, then the particular instruction is immediately preceded by a leading code indicating that path.

Still additional aspects of method 41 are appreciated by the return from step 46 to step 32, but in the alternative instance where an instruction after I100 is preceded by a restore code. In this event, the flow for such an instruction is through steps 48 through 52. To illustrate those steps, assume now that I101 through I105 proceeded through path 20 as discussed in the immediately preceding example, and I106 is now immediately preceded by a restore code. Turning now to step 48, it maintains the current instruction path for the most recently received instruction. Thus, in the present example, step 48 maintains path 20 as the selected path for I106. Next, step 50 retrieves the stored path from the storage medium written in step 44 above. Continuing with the above example, therefore, step 50 identifies that path 18 was stored and that information is retrieved. Step 52 then restores the path through system 10*a* to the path retrieved from the storage medium. Note, therefore, that this switch restores the instruction path to that which preceded the path for the group of instructions following the switch and store code, again using circuit 16 to accomplish the change. Thus, the proper CONTROL signal is issued to demultiplexer 14 and multiplexer 24 so that the next instruction received from stage 12, and assuming no further change by control circuit 16, passes along the restored path. In the current example, therefore, after I106 passes through instruction path 20, the CONTROL signal changes so that I107, without further change of the CONTROL signal, passes along instruction path 18. Next, the flow returns to step 32.

Given that the flow returns to step 32 from step 52, note therefore that the next received instruction passes along a path according to various considerations. As stated above, with no additional change of the CONTROL signal, the next instruction (e.g., I107) passes along the restored path, that is, the path which was used before the group of instructions following the switch and store leading code. In this instance, therefore, I107 passes along instruction path 18. However, note also that I107 also is analyzed according to method 41. Thus, the CONTROL signal may have established system 10*a* to route I107 along path 18, but may change again due to another leading code. For example, I107 may itself be preceded by another switch and store code which indicates instruction path 22 as the desired path for I107. In such an event, step 44 stores instruction path 18 as the current path (because the system had been restored to instruction path 18), and step 46 switches demultiplexer 14 so that I107 passes along instruction path 22. Thereafter, the process continues in the same manner as set forth above.

Given the above, one skilled in the art will appreciate still additional benefits of method 41. For example, by allowing the use of a switch and store leading code, a single code may be used to permit an entire group of instructions to follow along a given instruction path. Thus, where a block of instructions have been created for a given instruction path (e.g., for a given ISA), that block may begin with a switch and store leading code, and end with a restore leading code. As a result, when that block is incurred in a program of instructions, it passes along a corresponding instruction path and, when complete, the path which was in use before that block is restored so that additional instructions following the block then pass along a different path which is appropriate for those additional instructions. In addition to the above, note that methods 30*a*, 30*b*, and 41 are not necessarily exclusive alternatives and, indeed, in a preferred embodiment those methods are combined into a single system. In such an event, step 42 would detect whether the leading code was one of four types, thereby combining the switch for all later instructions action of FIG. 2*a*, with the single-instruction switch action from FIG. 2*b*, and with the two leading code types of FIG. 4. If either of the FIG. 2*a* or 2*b* leading codes were detected, then steps 38 and/or 39 would be performed so that, for either all instructions or a single instruction following a leading code, the path is changed according to the designation of the leading code. On the other hand, if either a switch and store code, or a restore code, were detected, the method would continue in the manner described in connection with FIG. 4.

Figure 5:
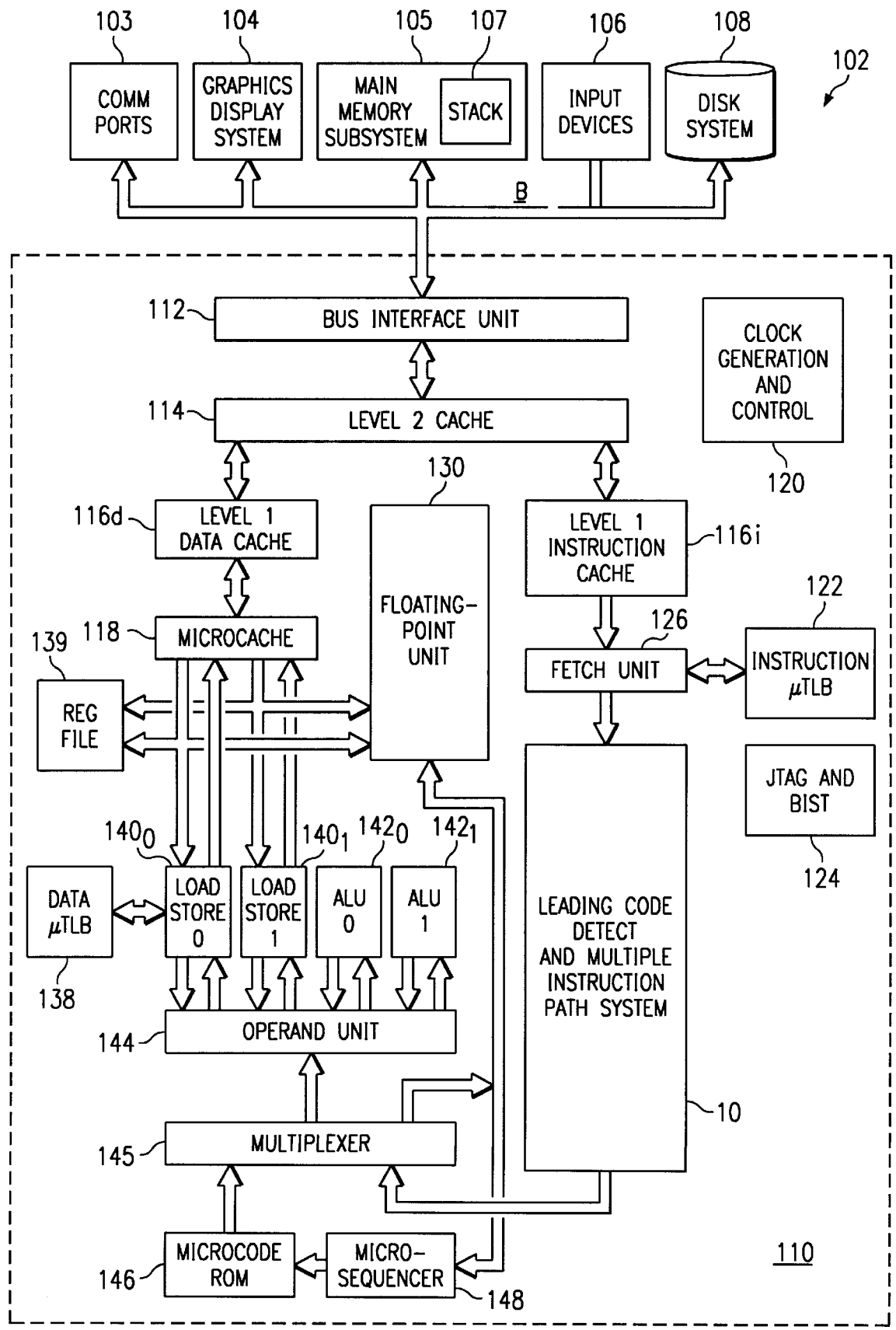
FIG. 5 illustrates an exemplary data processing system within which the preferred embodiments may be implemented.

Having described the above embodiments, FIG. 5 illustrates a block diagram of a microprocessor embodiment into which the above embodiments may be incorporated. FIG. 5 depicts an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 110, as shown in FIG. 5, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 5 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 5, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around level 2 cache 114, by treating certain bus reads and writes as "not cacheable". Level 2 cache 114, as shown in FIG. 5, is connected to two level 1 caches 116; level 1 data cache $116_d$ is dedicated to data, while level 1 instruction cache $116_i$ is dedicated to instructions. Power consumption by microprocessor 110 is minimized by accessing level 2 cache 114 only in the event of cache misses of the appropriate one of the level 1 caches 116. Furthermore, on the data side, microcache 118 is provided as a level 0 cache, which in this example is a fully dual-ported cache.

As shown in FIG. 5 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0, 142_2$ for processing conditional branch, integer, and logical operations, floating-point unit (FPU) 130, two load-store units $140_0, 140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Precode stage 0: This stage determines the length and starting position of up to three fetched x86-type instructions |
| PD1 | Precode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register and/or memory operands indicated by the AOps |
| EX | Execute: This stage runs the execution units according to the AOps and the retrieved operands |
| WB | Write back: This stage stores the results of the execution in registers or in memory |

Referring back to FIG. 5, the pipeline stages noted above are performed by various functional blocks within microprocessor 110. Fetch unit 126 generates instruction addresses from the instruction pointer, by way of instruction micro-translation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail herein below.

The output of fetch unit 126 is connected to a system block designated generally at 10. From the preceding description and Figures, one skilled in the art will appreciate that system block 10 may be either of systems 10a (of FIG. 3a) or 10b (of FIG. 3b) described above, as well as other alternative systems consistent with the inventive teachings of the present document. Thus, an instruction passing from fetch unit 126 to system block 10 may pass along one of various different paths, with a machine word being selected and output from system 10 to multiplexer 145.

The output of multiplexer 145 is connected to operand unit 144, which receives and prepares the operands for execution, As indicated in FIG. 5, operand unit 144 receives an input from system 10 and also from microcode ROM 148, via multiplexer 145, and fetches register operands for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cyde instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

From the above, one skilled in art may appreciate various benefits of the present embodiments. For example, a microprocessor in accordance with the various embodiments may permit instructions to follow different instruction paths in response to detection of an instruction path leading code. As another example, instructions from different ISAs may be combined for use on a single microprocessor, and/or may be combined to share certain resources while using separate resources for certain functions. Indeed, various ISAs which may benefit are known and include, by way of example and without limitation, DEC Alpha, DEC VAX, IBM 390, Intel x86, Hewlett Packard Precision Architecture, and Motorola 68000. In addition, the above demonstrates various alternative embodiments included within the inventive scope. For example, there is described a leading code which switches an instruction path for all instructions following such a leading code and until another leading code is detected. As another example, there is described a leading code which switches an instruction path for only the instruction immediately following such a leading code. As another example, there is described a switch and store leading code which switches an instruction path for a group of instructions immediately following such a leading code, and yet another alternative is a restore leading code which restores the instruction path to that which it was before one or more most recently received instructions were processed. As still another example, various circuits may be constructed to accomplish the many operational steps set forth. As yet another example, while the microprocessor of FIG. 5 depicts an exemplary microprocessor to benefit from the inventive embodiments, other microprocessor architectures could benefit as well. Indeed, these benefits and examples serve further to demonstrate that while the present embodiments have been described in detail, various substitutions, modifications or alterations could be made to the descriptions set forth above without departing from the inventive scope. Still further, in addition to the many options set forth above still other alternatives will be ascertainable by a person skilled in the art, and all of the above demonstrates the flexibility of the inventive scope which is defined by the following claims.

What is claimed is:

1. A method of operating a processor to process a plurality of instructions, the method comprising the steps of:

receiving an instruction from the plurality of instructions;

determining whether the received instruction is preceded by an instruction path leading code;

passing the received instruction along a single instruction decode path selected from among a plurality of instruction decode paths for decode of the received instruction;

in response to determining that the received instruction is preceded by an instruction path leading code, selecting the single instruction decode path for the received instruction preceded by the instruction path leading code from among the plurality of instruction decode paths corresponds to the instruction path leading code;

passing the received instruction as decoded by the selected single instruction decode path to a common execute stage having instruction execution resources, wherein a received instruction decoded by any of the plurality of instruction decode paths is permitted to employ all instruction execution resources of the common execute stage.

2. The method of claim 1 wherein the plurality of instruction paths comprises:

a first path comprising a first decode unit; and a second path comprising a second decode unit different than the decode unit in the first path.

3. The method of claim 1 wherein the plurality of instruction paths comprises:

a first path comprising a first decode unit and a schedule circuit; and a second path comprising a second decode unit and a schedule circuit different than the first decode unit and the schedule circuit in the first path.

4. The method of claim 1 wherein the plurality of instruction paths comprises:

a first path comprising a first decode unit;

a second path comprising a second decode unit different than the first decode unit in the first path; and wherein each of the first and second paths is operable to couple an instruction to a common schedule circuit.

5. The method of claim 1 wherein the plurality of instruction paths comprises:

a first path comprising a first decode unit and operable to couple an instruction to the common execute stage; and a second path comprising a bus connected to the common execute stage.

6. The method of claim 5 wherein the common execute stage comprises a plurality of execution units.

7. The method of claim 1 wherein the plurality of instruction paths comprises:

a first path comprising a first decode unit and operable to couple an instruction to the common execute stage;

a second path comprising a second decode unit different than the first decode unit in the first path, wherein the second path is operable to couple an instruction to the common execute stage; and a third path comprising a bus connected to the common execute stage.

8. The method of claim 7 wherein the common execute stage comprises a plurality of execution units.

9. The method of claim 1 wherein the common execute stage comprises a plurality of execution units.

10. The method of claim 1 wherein:
said step of passing the received instruction along the single instruction decode path consists of passing each received instruction along a current single instruction decode path corresponding to a last received instruction path leading code.

11. The method of claim 1 wherein:
said step of passing the received instruction along the single instruction decode path consists of
passing each received instruction along a current single instruction decode path unless the received instruction is preceded by an instruction path leading code,
passing each received instruction preceded by an instruction path leading code along a single instruction decode path corresponding to the instruction path leading code and thereafter passing each received instruction along the current signal instruction decode path.

12. The method of claim 1 wherein:
said step of passing the received instruction along the single instruction decode path consists of
passing each received instruction along a current single instruction decode path unless the received instruction is preceded by a switch and store instruction path leading code or a restore instruction path leading code,
when a received instruction is preceded by a switch and store instruction path leading code
storing the current single instruction decode path to thereby become a stored prior single instruction decode path, and
passing the received instruction preceded by the switch and store instruction path leading code along a switched single instruction decode path corresponding to the switch and store instruction path leading code, the switched single instruction decode path thereby becoming the current single instruction decode path, and
when a received instruction is preceded by a restore instruction path leading code, recalling the stored prior instruction decode path to thereby become the current instruction decode path and passing the received instruction preceded by the restore instruction path leading code along the recalled prior instruction decode path.

13. A method of operating a processor to process a plurality of instructions, the method comprising the steps of:
receiving an instruction from the plurality of instructions;
determining whether the received instruction is preceded by an instruction path leading code;
passing the received instruction along at least one instruction path in a plurality of instruction paths;
in response to determining that the received instruction is preceded by an instruction path leading code, selecting the single instruction decode path for the received instruction preceded by the instruction path leading code from among the plurality of instruction decode paths corresponds to the instruction path leading code;
said step of passing the received instruction along the single instruction decode path consisting of
passing each received instruction along a current single instruction decode path unless the received instruction is preceded by a switch and store instruction path leading code or a restore instruction path leading code,
when a received instruction is preceded by a switch and store instruction path leading code
storing the current single instruction decode path to thereby become a stored prior single instruction decode path, and
passing the received instruction preceded by the switch and store instruction path leading code along a switched single instruction decode path corresponding to the switch and store instruction path leading code, the switched single instruction decode path thereby becoming the current single instruction decode path, and
when a received instruction is preceded by a restore instruction path leading code, recalling the stored prior instruction decode path to thereby become the current instruction decode path and passing the received instruction preceded by the restore instruction path leading code along the recalled prior instruction decode path;
wherein the plurality of instruction paths comprises:
a first path comprising a first decode unit and operable to couple an instruction to an execute stage;
a second path comprising a second decode unit different than the first decode unit in the first path, wherein the second path is operable to couple an instruction to the execute stage; and
a third path comprising a bus connected to the execute stage; and
passing the received instruction as decoded by the selected single instruction decode path to a common execute stage having instruction execution resources, wherein a received instruction decoded by any of the plurality of instruction decode paths is permitted to employ all instruction execution resources of the common execute stage.

14. A microprocessor for processing a plurality of instructions, said microprocessor comprising:
circuitry for receiving an instruction from the plurality of instructions;
circuitry for determining whether the received instruction is preceded by an instruction path leading code;
a plurality of instruction decode paths, each instruction decode path for decoding a received instruction according to a predetermined instruction set architecture;
circuitry for passing the received instruction along a selected one instruction decode path selected from among a plurality of instruction decode paths; and
instruction decode path control circuitry connected to said circuitry for determining whether the received instruction is preceded by an instruction path leading code and to said circuitry for passing the received instruction along said selected instruction decode path, said instruction decode path control circuitry operable in response to determining that the received instruction is preceded by an instruction path leading code for selecting said one instruction decode path for the received instruction preceded by the instruction path leading code from among the plurality of instruction decode paths corresponding to the instruction path leading code;
a common execute stage receiving said received instruction as decoded by said selected instruction decode path having instruction execution resources for executing said received instruction, wherein a received instruction decoded by any of the plurality of instruction decode paths is permitted to employ all instruction execution resources of the common execute stage.

15. The microprocessor of claim 14 wherein the plurality of instruction paths comprises:

a first path comprising a first decode unit; and a second path comprising a second decode unit different than the decode unit in the first path.

16. The microprocessor of claim 14 wherein the plurality of instruction paths comprises:

a first path comprising a first decode unit and a schedule circuit; and a second path comprising a second decode unit and a schedule circuit different than the first decode unit and the schedule circuit in the first path.

17. The microprocessor of claim 14 wherein the plurality of instruction paths comprises:

a first path comprising a first decode unit;

a second path comprising a second decode unit different than the first decode unit in the first path; and wherein each of the first and second paths is operable to couple an instruction to a common schedule circuit.

18. The microprocessor of claim 14 wherein the plurality of instruction paths comprises:

a first path comprising a first decode unit and operable to couple an instruction to said common execute stage;

a second path comprising a second decode unit different than the first decode unit in the first path, wherein the second path is operable to couple an instruction to said common execute stage; and a third path comprising a bus connected to said common execute stage.

19. The microprocessor of claim 14 wherein said common execute stage comprises a plurality of execution units.

20. The microprocessor of claim 14 wherein said common execute stage comprises a plurality of execution units.

21. The microprocessor of claim 14 wherein:

said circuitry for passing the received instruction along one instruction decode path passes each received instruction along a current single instruction decode path unless the received instruction is preceded by a switch and store instruction path leading code or a restore instruction path leading code, when a received instruction is preceded by a switch and store instruction path leading code said circuitry for passing the received instruction along one instruction decode path stores the current single instruction decode path to thereby become a stored prior single instruction decode path, and passes the received instruction preceded by the switch and store instruction path leading code along a switched single instruction decode path corresponding to the switch and store instruction path leading code, the switched single instruction decode path thereby becoming the current single instruction decode path, and when a received instruction is preceded by a restore instruction path leading code, said circuitry for passing the received instruction along one instruction decode path recalls the stored prior instruction decode path to thereby become the current instruction decode path and passes the received instruction preceded by the restore instruction path leading code along the recalled prior instruction decode path.

22. The microprocessor of claim 14 wherein the plurality of instruction paths comprises:

a first path comprising a first decode unit and operable to couple an instruction to said common execute stage; and a second path comprising a bus connected to said common execute stage.

23. The microprocessor of claim 22 wherein said common execute stage comprises a plurality of execution units.

24. The microprocessor of claim 14 wherein:

said circuitry for passing the received instruction along one instruction decode path passes each received instruction along a current single instruction decode path corresponding to a last received instruction path leading code.

25. The microprocessor of claim 14 wherein:

said circuitry for passing the received instruction along one instruction decode path passes each received instruction along a current single instruction decode path unless the received instruction is preceded by an instruction path leading code, passes each received instruction preceded by an instruction path leading code along a single instruction decode path corresponding to the instruction path leading code and thereafter passes each received instruction along the current signal instruction decode path.

* * * * *

UNITED STATES PATENT AND TRADEMARK OFFICE
CERTIFICATE OF CORRECTION

PATENT NO: 5,961,632

DATED: 10/5/99

INVENTOR(S): Jonathan H. Shiell, Donald E. Steiss

It is certified that error appears in the above-identified patent and that said Letters Patent are hereby corrected as shown below:

Cover Page, insert Item [60] under Related U.S. Application Data

--Provisional Application No. 60/022,349 July 25, 1996.--

Signed and Sealed this

Twenty-second Day of May, 2001

*Attest:*

NICHOLAS P. GODICI

*Attesting Officer*     Acting Director of the United States Patent and Trademark Office